United States Patent
Öttinger et al.

(10) Patent No.: US 11,434,428 B2
(45) Date of Patent: Sep. 6, 2022

(54) COKE WITH ADDITIVES

(71) Applicant: Tokai COBEX GmbH, Wiesbaden (DE)

(72) Inventors: Oswin Öttinger, Meitingen (DE); Heribert Walter, Meitingen (DE); Martin Christ, Meitingen (DE); Johann Daimer, Mörfelden-Walldorf (DE); Wilhelm Frohs, Allmannshofen (DE); Frank Hiltmann, Meitingen (DE); Rainer Schmitt, Meitingen (DE)

(73) Assignee: Tokai COBEX GmbH, Wiesbaden (DE)

( * ) Notice: Subject to any disclaimer, the term of this patent is extended or adjusted under 35 U.S.C. 154(b) by 0 days.

(21) Appl. No.: 16/072,283

(22) PCT Filed: Jan. 30, 2017

(86) PCT No.: PCT/EP2017/051882
§ 371 (c)(1),
(2) Date: Jul. 24, 2018

(87) PCT Pub. No.: WO2017/129808
PCT Pub. Date: Aug. 3, 2017

(65) Prior Publication Data
US 2019/0031961 A1    Jan. 31, 2019

(30) Foreign Application Priority Data
Jan. 29, 2016   (DE) ................. 10 2016 201 429.3

(51) Int. Cl.
*C10B 57/06* (2006.01)
*C10B 55/02* (2006.01)
(Continued)

(52) U.S. Cl.
CPC ............ *C10B 57/06* (2013.01); *C01B 32/205* (2017.08); *C04B 35/522* (2013.01);
(Continued)

(58) Field of Classification Search
CPC . C10B 57/06; C10B 55/02; C04B 2235/3232; C04B 35/522; C04B 35/528
See application file for complete search history.

(56) References Cited

U.S. PATENT DOCUMENTS 4,082,650 A * 4/1978 Li ........................ C10B 55/00
208/106
4,366,048 A * 12/1982 Metrailer ................ C10G 9/32
208/127

(Continued)

FOREIGN PATENT DOCUMENTS

CN 101158048 A 4/2008
CN 104610993 A * 5/2015
(Continued)

OTHER PUBLICATIONS

Machine Translation of JP 2004131739 (Year: 2004).*
(Continued)

*Primary Examiner* — Ellen M McAvoy
*Assistant Examiner* — Ming Cheung Po
(74) *Attorney, Agent, or Firm* — Maier & Maier, PLLC

(57) ABSTRACT

Coke including additives that are accumulated at the yield points or in the regions surrounded by the yield points. For homogeneous distribution, the additives are continuously dosed into the delayed coker during the filling time. The dosing can be carried out by powdery blowing with an inert gas (nitrogen) or also distributed in a slurry consisting of the reaction components and a partial flow of the coker feed (vacuum resid, pytar, decant oil or coal-tar distillates). According to an advantageous form of embodiment, the (Continued)

additives may optionally have a diameter of between 0.05 mm and 5 mm, preferably between 1 mm and 3 mm. Advantageously, the additives can be selected from at least one of acetylene coke, fluid coke, flexi coke, shot coke, carbon black, non-graphitisable carbons (chars), non-graphitic anthracite, silicon carbide, titanium carbide, titanium diboride or mixtures thereof.

7 Claims, 1 Drawing Sheet

(51) Int. Cl.
    *H05B 7/085*     (2006.01)
    *C04B 35/52*     (2006.01)
    *C04B 35/528*     (2006.01)
    *C25C 3/08*     (2006.01)
    *C04B 35/532*     (2006.01)
    *C01B 32/205*     (2017.01)

(52) U.S. Cl.
    CPC .......... *C04B 35/528* (2013.01); *C04B 35/532* (2013.01); *C10B 55/02* (2013.01); *C25C 3/08* (2013.01); *H05B 7/085* (2013.01); *C04B 2235/3232* (2013.01); *C04B 2235/3409* (2013.01); *C04B 2235/3813* (2013.01); *C04B 2235/3826* (2013.01); *C04B 2235/3843* (2013.01); *C04B 2235/424* (2013.01); *C04B 2235/425* (2013.01); *C04B 2235/5427* (2013.01); *C04B 2235/5436* (2013.01); *C04B 2235/5445* (2013.01); *C04B 2235/72* (2013.01); *C04B 2235/9607* (2013.01)

(56) References Cited

U.S. PATENT DOCUMENTS

| | | | |
|---|---|---|---|
| 5,174,891 | A | 12/1992 | Becraft |
| 6,024,863 | A | 2/2000 | LeCours et al. |
| 6,258,224 | B1 | 7/2001 | Mirtchi |
| 6,428,885 | B1 | 8/2002 | Seitz et al. |
| 7,276,284 | B2 | 10/2007 | Frohs |
| 7,658,838 | B2 * | 2/2010 | Varadaraj ................ C10B 57/06 208/131 |
| 2009/0000425 | A1 | 1/2009 | Daimer |
| 2016/0190547 | A1 | 6/2016 | Schweiss |

FOREIGN PATENT DOCUMENTS

| | | |
|---|---|---|
| CN | 105199765 A * | 12/2015 |
| DE | 25 1 7 814 A1 | 1/1976 |
| DE | 10 2010 029 538 A1 | 12/2011 |
| DE | 102013217882 A1 | 3/2015 |
| EP | 0754746 B1 | 9/1998 |
| GB | 1449798 A | 9/1976 |
| JP | H02-069308 A | 3/1990 |
| JP | 2004-124014 A | 4/2004 |
| JP | 2004131739 A * | 4/2004 |
| WO | 2004/104139 A1 | 12/2004 |
| WO | WO-2004104139 A1 * | 12/2004 ............. C10B 55/00 |

OTHER PUBLICATIONS

Machine Translation of CN 104610993A (Year: 2015).*
Machine Translation of CN105199765A (Year: 2015).*
Kawamura et al., "Polymeric Carbons from Gwyn Morgan Jenkins", Cambridge University Press, 1976, p. 34-35; 1 page.
"German Standard", DIN 51909, May 2009, p. 1-8; 16 pages.
"Determination of the Hardgrave grindability index of hard coal", DIN 51742, Jul. 2001, p. 1-6; 6 p.
"Particle size analysis—Sieve analysis", DIN 166165-1, Aug. 2016, p. 1-13; 26 pages.
International Search Report and Written Opinion of the International Search Authority dated Apr. 11, 2017 of corresponding International application No. PCT/EP2017/051882; 15 pgs.
"Particle size analysis—Laser diffraction methods", ISO 13320:2009, Oct. 2009, p. 1-5; 11 pgs.

* cited by examiner

COKE WITH ADDITIVES

FIELD

The invention relates to a novel coke comprising additives and use thereof.

BACKGROUND

Cokes such as petroleum cokes and coal-tar pitch cokes can be produced using the delayed coking method, but these are produced from different raw materials. To produce petroleum cokes, refinery residues (vacuum resid, slurry oil, decant oil, thermal tar, ethylene tar) are supplied to the delayed coker wherein, at temperatures of 450° C. to 550° C., so-called green petroleum coke is obtained which subsequently, in a calcining step at 1100° C. to 1500° C., can be converted into calcined petroleum coke.

When producing coal-tar pitch coke, the coal tar resulting from the production of metallurgical coke and foundry coke is distilled, and the obtained coal-tar pitch is supplied to the delayed coker wherein, at temperatures of 450° C. to 550° C., green coal-tar pitch coke is obtained which subsequently, in a calcining step at 1100° C. to 1500° C., can be converted into a calcined coal-tar pitch coke.

It is known that a structural improvement of the coke can be achieved by adding carbon fibres to the delayed coker (U.S. Pat. No. 7,276,284B2). Furthermore, it is known that the properties of the carbon products, such as for example graphite electrodes or cathode blocks, are able to be influenced by adding additives when producing carbon products. The lifespan can for example be improved as a result (DE102010029538A1).

For example, in the aluminium industry, titanium diboride ($TiB_2$) is added as an additive when producing cathode blocks, in order to achieve a better wetting with liquid aluminium. U.S. Pat. No. 6,258,224 describes, for example, the addition of $TiB_2$ in the upper layer of a cathode block built in layers. Likewise, CN101158048 describes a carbon composite material containing 20% to 60% $TiB_2$. U.S. Pat. No. 6,428,885 describes a support body with a titanium diboride-containing protective coating.

$TiB_2$ is produced at high temperatures, at high energy consumption. When producing carbon products with improved wetting properties, the coarse-grained coke and close-grained $TiB_2$ need to be mixed homogeneously, with considerable technical outlay.

This can be explained by the different particle size distribution and densities of the materials, as these require to be easy segregated.

A further disadvantage resulting from the different particle sizes is that, when processing carbon products or due to wear, regions are produced on the surface which contain only carbon of the coarse-grained coke and islands which contain $TiB_2$, and optionally a dust and binder matrix. This leads to the surface not being able to be as well wetted with aluminium due to the formation of islands. Ultimately, this leads to the lifespan being shortened due to mechanical and chemical stresses on the carbon product.

Therefore, the object of the invention is to provide a coke which increases the lifespan of the carbon products produced from the coke.

SUMMARY

The object is achieved by a coke comprising additives, characterised in that additives are accumulated at the yield points or in the regions surrounded by the yield points.

Within the scope of this invention, yield points are understood to mean the boundaries between optically non-anisotropic regions which have been created when the mesophase has set during coking.

The term "mesophase" defines a characteristic state of order between the liquid and solid phase of a system. When transitioning from liquid to solid phase, a conversion takes place during pyrolysis from an unordered isotropic phase into an ordered, anisotropic phase.

According to the invention it has been recognised that the properties of the coke can be tailored due to the accumulation of additives at yield points or in the regions surrounded by the yield points, wherein for example wettability and abrasion resistance can be influenced by a suitable choice of additives. In turn, this influence brings about a longer lifespan of the carbon products produced from the coke.

Advantageously, the coke is chosen from the group consisting of petroleum coke, coal-tar pitch coke or from the residues of coal gasification, coal hydrogenation or also the cokes obtained from Fischer-Tropsch synthesis or from a petrol/coal-tar pitch mixture obtained from the mixture of petrol and coal-tar pitch residues or any mixture of the named cokes.

According to the invention, the additives accumulated at the yield points or in the regions surrounded by the yield points can be accumulated at the yield points or embedded in the regions surrounded by the yield points or accumulated both at the yield points and embedded in the regions surrounded by the yield points.

The additive particles at the yield points include all additive particles which touch the yield point.

Accumulation at the yield points or in the regions surrounded by the yield points is understood to mean that an additive particle percentage of at least 70 is arranged at the yield points or in the regions surrounded by the yield points. If the additive particle percentage is less than 70, the coke properties are not influenced.

Additive particle percentage is understood to mean the percentage proportion of additive particles in a sample.

The accumulation of additive particles is determined by optical microscopy or scanning electron microscopy with associated energy-dispersive X-ray spectroscopy (EDX).

Advantageously, the additives are selected from the group consisting of acetylene coke, fluid coke, flexi coke, shot coke, carbon black, non-graphitisable carbons (chars), non-graphitic anthracite, silicon carbide, titanium carbide, titanium diboride or mixtures thereof.

Acetylene coke is a coke which accrues as a by-product during the production of unsaturated hydrocarbons, in particular acetylene, and subsequently, regardless of the type of unsaturated hydrocarbon during the production of which it accrues, is denoted as acetylene coke. Acetylene coke has a structure which is close-grained and similar to the layers of skin of an onion.

According to this invention, non-graphitic anthracite is understood to mean an anthracite which is obtained by a temperature treatment of less than 2000° C.

Within the scope of this invention, fluid coke is understood to mean the coking product of high-boiling hydrocarbon fractions (heavy residues from mineral oil or carbon processing, produced according to the fluid coking process). Fluid coke has an isotropic structure. The mass fraction of the removable volatile components is 6%.

Within the scope of this invention, flexi coke is understood to mean a coke which is produced in the fluidised bed method, such as for example in the flexi coking method developed by Exxon Mobile, a thermal cracking method using fluidised bed reactors. Using this method, coke particles with a spherical to elliptical-shaped configuration are obtained, which configuration is designed similar to the layers of skin of an onion.

Within the scope of this invention, shot coke is understood to mean a coke which is produced by delayed coking. The particles of this coke have a spherical morphology.

Carbon black is understood to mean an industrially produced, close-grained carbon consisting of spherical primary particles.

Chars are non-graphitisable, solid products which are produced during the charcoaling process of natural or synthetic organic material (Polymeric Carbons from Gwyn Morgan Jenkins, Kiyoshi Kawamura, 1976, "Coals of lowest rank (lignite) are said to possess a polymeric structure. On pyrolysis, coals of low rank form isotropic chars (polymeric carbon), bituminous coals produce textured crystalline cokes, while anthracites, although not coking in the normal sense, eventually yield graphites at sufficiently high temperatures").

The additives can be formed also according to a further advantageous embodiment initially by an "in-situ formation" during graphitisation of the carbon products produced from the coke. For this, the coke contains $B_2O_3$ or $B_4C$ and $TiO_2$ as precursors. The in-situ formation of titanium diboride during graphitisation of the carbon products produced from the coke has the advantage that the formed additives are distributed homogeneously. In cathode blocks this has the advantage, for example, that the wettability is improved, and the lifespan is thus also increased. Additionally, costly mixing processes for producing a homogeneous coke/titanium diboride mixture can be dispensed with. The "in-situ formation" of titanium diboride has the advantage that costly and more expensive production methods of titanium diboride can be dispensed with.

Within the scope of the invention, it is preferred that the additives have a diameter of 0.1 to 49 μm, particularly preferably of 1 to 3 μm. The diameters occurring in this region are determined using laser diffraction (ISO 13320-2009).

When there is an additive diameter of 0.1 to 49 μm, mesophase formation is disrupted when reacting the feed material supplied to the delayed coker to the extent that a coke is obtained which has entirely different properties from a coke in which mesophase formation is not disrupted. These properties relate to coke hardness, achievable material solidity, thermal and electrical conductivity, thermal expansion, and isotropy of these properties. A further property which can be influenced is the wettability of the surface; for example it is desirable in a "drained cell" that wettability is increased with molten aluminium, whereas the wettability is intended to be lowered with a metal crucible. The extent of wettability can be tailored. The coefficient of thermal expansion (CTE) is increased tenfold by adding additives, depending on the quantity and size of the additives.

CTE is a characteristic value for thermal expansion and describes the behaviour of a material in respect of the changes in its dimensions, upon changes in temperature. The CTE is measured according to DIN 51909 (2009 May). Moreover, a coke obtained by destruction of the mesophase has a greater hardness of up to 2-3 times a coke produced without additives.

The hardness of a coke is described by the so-called Hardgrove index (HGI) and determined according to DIN 51742 (2001 July).

According to the invention, the proportion of additives in the coke is 0.5 to 8 wt.-%, preferably 1 to 4 wt.-%. There is no further increase in the hardness of the coke when the additive proportion is greater than 8 wt.-%. When smaller than 0.5 wt.-%, the additives do not have any influence on the disruption of the mesophase formation. If, for example, the coke consists of coke particles and additives, and the proportion of additives is 4 wt.-%, then the proportion of coke particles is 96 wt.-%.

According to a further advantageous embodiment, the additives have a diameter of 0.05 mm to 5 mm, preferably 1 to 3 mm. The diameters in this range are determined using sieve analysis (DIN I 66165-2016; method F). An embedding in the regions surrounded by the yield points is achieved with these diameters of the additives. When there is a diameter of less than 0.05 mm, mesophase formation is disrupted as described above, and an accumulation of the additives takes place at the yield points. When there is a diameter of greater than 5 mm, there is no embedding in the regions surrounded by the yield points, as the diameter of the additives is greater than the diameter of the regions surrounded by the yield points. These mixtures are used when producing polygranular carbon and graphite materials.

Embedding the additives in the regions surrounded by the yield points cause the CTE to increase two to three fold, depending on the type, size and quantity of additives. Likewise, the hardness of the resulting coke is increased two to three fold. A coke tailored in terms of properties can be produced by the additives. This causes a higher hardness and a higher CTE, whereby the products produced from the coke have a longer lifespan.

According to the invention, the proportion of additives is 1 to 40 wt.-%, preferably 5 to 20 wt.-%. When the proportion of additives is greater than 20 wt.-%, no further increase in the hardness can be achieved by embedding the additives in the regions surrounded by the yield points. With fewer than 1 wt.-% additives, the embedded additives do not have any influence on the properties of the coke.

If, for example, the coke consists of coke and additives, and the proportion of additives is 20 wt.-%, then the proportion of coke is 80 wt.-%.

According to a further embodiment, it is preferred that the additives are present as a mixture of additives with a diameter of 0.1 μm to 49 μm and a diameter of 0.05 mm to 5 mm.

By using a mixture of additives of different diameters, the coke can be tailored in respect of the properties of coke hardness, achievable material solidity, thermal and electrical conductivity, thermal expansion, as well as isotropy of these properties, to be even more flexible than when using additives of one diameter. The result of this is that the carbon products produced from this have a longer lifespan. Additives with a diameter of 0.05 mm to 5 mm are embedded in the regions surrounded by the yield points. Whereas, because of additives of the mixture which have a diameter of less than 0.05 mm, the mesophase formation is disrupted as described above, and an accumulation of the additives takes place at the yield points. When there is a diameter of greater than 5 mm, there is no embedding in the regions surrounded by the yield points, as the additives are larger than the diameter of the regions surrounded by the yield points. Depending on the size, the mixture of the additives of different diameters thus causes both an embedding in the regions surrounded by the yield points and also an accumulation at the yield points.

According to the invention, the proportion of the mixture of additives with a diameter of 0.1 μm to 49 μm is 0.5 to 8 wt.-%, preferably 2 wt.-%, and the proportion of the mixture of additives with a diameter of 0.05 mm to 5 mm is 5 to 20 wt.-%, preferably 10 wt. %.

If the proportion of additives with a diameter of 0.1 µm to 49 µm is greater than 8 wt.-%, and the proportion of additives with a diameter of 0.05 mm to 5 mm is greater than 20 wt.-%, then the coke properties such as solidity, thermal and electrical conductivity and thermal expansion in the background and the additive properties begin to dominate. When the proportion of additives with a diameter of 0.1 µm to 49 µm is less than 2 wt.-%, and the proportion of those with a diameter of 0.05 mm to 5 mm is less than 5 wt.-%, the additives do not have any influence on the properties of the obtained coke.

A further subject matter of the present invention is the use of a previously described coke for furnace linings, graphite electrodes for steel production, graphite bodies for connecting graphite electrodes, cathode blocks for aluminium production, nuclear applications, apparatus engineering for process technology in the field of strongly corrosive media, tube bundle heat exchangers, speciality graphites, for example for silicon production, solar wafer production, electrodes for electric discharge machining and heating elements, slide ring seals, graphite bearings, graphite pump impellers or graphite crucibles, preferably for coke furnace linings, graphite electrodes for steel production or cathode blocks for aluminium production. By using this novel coke, new cathode blocks, which lead to savings on energy when aluminium is being produced, can be produced according to the drained cell concept.

However, in principle, this applies to all uses of carbon and graphite materials where isotropy, abrasion resistance, chemical resistance, fracture toughness and wettability are paramount.

BRIEF DESCRIPTION OF THE DRAWINGS

Further features and advantages of the invention are now explained in more detail with reference to the subsequent figures, without being limited thereto.

DETAILED DESCRIPTION

Figure 1:
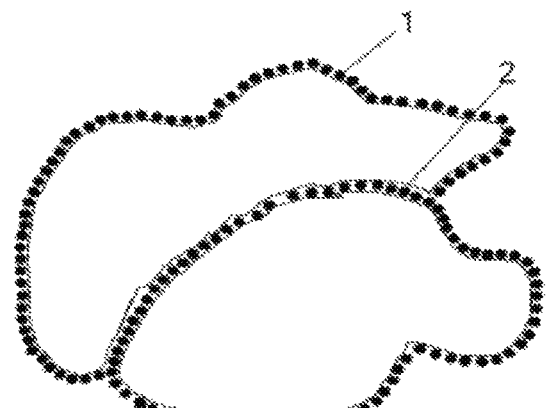
FIG. 1 a schematic representation of a section from a coke with accumulation of additives at the yield points.

FIG. 1 shows a schematic representation of a section from a coke with an accumulation of additives (1) at the yield points (2). The additives (1) have a diameter which is selected from the range 0.1 µm to 49 µm.

Figure 2:
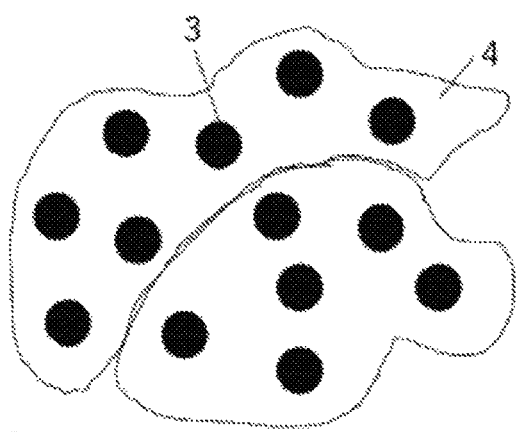
FIG. 2 a schematic representation of a section from a coke with accumulation of additives in the regions surrounded by the yield points.

FIG. 2 shows a schematic representation of a section from a coke with an accumulation of additives (3) in the regions (4) surrounded by the yield points. The additives (3) have a diameter which is selected from the range 0.05 mm to 5 mm.

Figure 3:
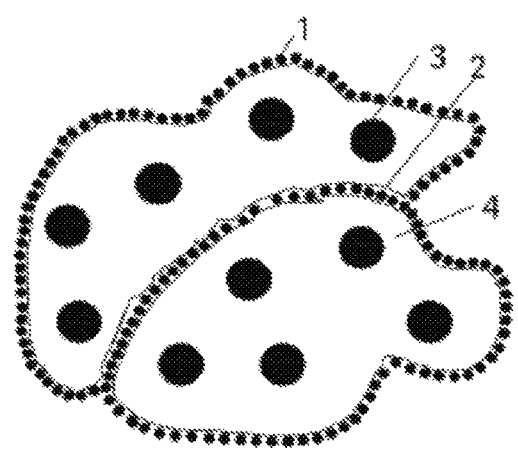
FIG. 3 a schematic representation of a section from a coke with accumulation of additives at the yield points and in the regions surrounded by the yield points.

FIG. 3 shows a schematic representation of a section from a coke with accumulation of additives (1) at the yield points (2) and in the regions (4) surrounded by the yield points. The additives (1) have a diameter which is selected from the range 0.1 µm to 49 µm. The additives (3) have a diameter which is selected from the range 0.05 mm to 5 mm.

Embodiments of the present invention are now explained using embodiment examples, wherein the embodiment examples do not represent any limitation of the invention.

Embodiment Example 1

For homogeneous distribution of the later reaction components in the coke material, $TiO_2$ and $B_2O_3$ are continuously dosed, each with a particle diameter of 1-3 µm and a stoichiometric ratio of 1:1, into the delayed coker during the filling time of 12 hours. The dosing can be carried out by powdery blowing with an inert gas (nitrogen) or also distributed in a slurry consisting of the reaction components and a partial flow of the coker feed (vacuum resid, pytar, decant oil or coal-tar distillates). The concentration of the reaction components conforms to the desired $TiB_2$ concentrations in the end-product. In the present example, a slurry is dosed with the pro rata wt.-% as follows: Slurry (vacuum resid,)=84.3 wt.-%, $TiO_2$ 8.4 wt.-%, $B_2O_3$ 7.3 wt.-% The result is the desired coke with the following proportions: Coke=61.6 wt.-%, $TiO_2$=20.5 wt.-% and $B_2O_3$=17.9 wt.-%. The result is a synthetic graphite body with a finely distributed $TiB_2$ proportion of 25.5 wt.-%, produced according to green manufacturing, baking and thermal finishing above 2200° C.

There is an additive particle percentage of 70 at the yield points.

Depending on the additive diameter, in this embodiment example the additives can be accumulated at the yield points or in the regions surrounded by the yield points. For example, the wetting behaviour of cathode blocks can be improved vis-a-vis aluminium melting. The wetting behaviour can be tailored by controlling the additive proportion.

Embodiment Example 2

A gas-calcined anthracite was ground on an impact mill to a diameter of approx. 3 µm and a grain fraction of 1-3 µm was produced as a result, by means of sieving. This was dispersed with 10 wt.-% in an ethylene tar. This dispersion was introduced into a delayed coker with a temperature of 490° C. Coking pressure was 6.6 bar with a coking time of 10 hours. The green petroleum coke was calcined at 1300° C. The result is an isotropic petroleum coke with a CTE of 4.5 $10^{-6}$ $K^{-1}$ and an ash content of 0.09%, wherein the boron content was 0.2 ppm. This coke is suitable for high purity isographites and reactor graphite in nuclear power plants.

In this embodiment example, the additives are accumulated at the yield points with an additive particle percentage of 70.

Embodiment Example 3

A petrol-based vacuum resid is supplied to a delayed coker at 460° C. Coking pressure was 5.0 bar with a coking time of 8 hours. During the entire coking period, 10% of the coker feed was added as a dispersion from the vacuum resid, and 10 wt.-% of acetylene coke with a diameter of 0.4 to 0.8 mm at the head of the coking drum. After calcining the green coke, the result is a petroleum coke with an embedded proportion of 4 wt.-% acetylene coke. The coke CTE was 3.5 $10^{-6}$ $K^{-1}$. Mechanical resistance was increased by 6% over a comparable coke without acetylene coke deposits. The additives in this embodiment example are accumulated in the regions surrounded by the yield points with an additive particle percentage of 70.

The use of this coke in a graphitic cathode in aluminium-fused-salt electrolysis would equate to a 1-2-year extension in lifespan.

The invention claimed is:

1. A coke comprising:
additives different from the coke to enable tailoring of properties of the coke by accumulation of the additives in the coke, the additives being selected from the group consisting of silicon carbide, titanium carbide, titanium diboride and mixtures thereof,
wherein the additives are accumulated in the coke at yield points defined by boundaries between optically non-anisotropic regions which have been created when a mesophase has set during coking, in the regions surrounded by the yield points, or accumulated at both the yield points and embedded in the regions surrounded by the yield points, and
wherein the additives have a diameter of 0.1 µm to 49 µm or a diameter of 0.5 mm to 5 mm, or
wherein the additives are present as a mixture of additives with a diameter of 0.1 µm to 49 µm and a diameter of 0.5 mm to 5 mm.

2. The coke according to claim 1, wherein the coke is selected from the group consisting of petroleum coke, coal-tar pitch coke, coke obtained from residues of coal gasification, coke obtained from residues of coal hydrogenation, coke obtained from Fischer-Tropsch synthesis, coke obtained from a petrol/coal-tar pitch mixture obtained from a mixture of petrol and coal-tar pitch residues, and any mixture thereof.

3. The coke according to claim 1, wherein the additives are accumulated at both the yield points and embedded in the regions surrounded by the yield points.

4. The coke according to claim 1, wherein the coke comprises 0.5 to 8 wt.-% of additives.

5. The coke according to claim 1, wherein the coke comprises 1 to 40 wt.-% of additives.

6. The coke according to claim 1, wherein the coke comprises 0.5 to 8 wt.-% of the additives with a diameter of 0.1 µm to 49 µm and 5 to 20 wt.-% of the additives with a diameter of 0.05 mm to 5 mm.

7. The coke according to claim 1, wherein the additives are accumulated at the yield points or embedded in the regions surrounded by the yield points.

* * * * *